United States Patent [19]
Schaffner et al.

[11] Patent Number: 6,096,113
[45] Date of Patent: *Aug. 1, 2000

[54] INTEGRATED, CLOSED TANK BIOOXIDATION/HEAP BIOLEACH/PRECIOUS METAL LEACH PROCESSES FOR TREATING REFRACTORY SULFIDE ORES

[75] Inventors: Michael R. Schaffner, Battle Mountain, Nev.; John D. Batty, Blairgowrie, South Africa

[73] Assignees: Echo Bay Mines, Limited, Canada; Biomin Technologies SA, Switzerland

[*] Notice: This patent is subject to a terminal disclaimer.

[21] Appl. No.: 09/255,261

[22] Filed: Feb. 22, 1999

Related U.S. Application Data

[63] Continuation-in-part of application No. 08/857,880, May 16, 1997, Pat. No. 5,873,927.

[51] Int. Cl.⁷ ................................................. C22B 3/18
[52] U.S. Cl. .................... 75/712; 75/744; 423/DIG. 17
[58] Field of Search ........................ 75/712, 710, 743, 75/744; 423/DIG. 17

[56] References Cited

U.S. PATENT DOCUMENTS

| | | |
|---|---|---|
| 4,530,763 | 7/1985 | Clyde et al. . |
| 4,729,788 | 3/1988 | Hutchins et al. . |
| 5,021,088 | 6/1991 | Portier . |
| 5,127,942 | 7/1992 | Brierley et al. . |
| 5,143,543 | 9/1992 | Reid et al. . |
| 5,246,486 | 9/1993 | Brierley et al. . |
| 5,431,717 | 7/1995 | Kohr . |
| 5,443,621 | 8/1995 | Kohr . |
| 5,462,720 | 10/1995 | Aragones . |
| 5,573,575 | 11/1996 | Kohr . |
| 5,611,839 | 3/1997 | Kohr ........................................ 75/712 |
| 5,766,930 | 6/1998 | Kohr . |
| 5,873,927 | 2/1999 | Schaffner et al. ........................ 75/710 |

FOREIGN PATENT DOCUMENTS

| | | |
|---|---|---|
| 52258/90 | 3/1990 | Australia . |
| 1023947 | 1/1978 | Canada . |
| 0 522 978 A1 | 1/1993 | European Pat. Off. . |
| 2180829 | 4/1987 | United Kingdom . |
| WO87/04694 | 8/1987 | WIPO . |
| WO96/12826 | 5/1996 | WIPO . |

Primary Examiner—Melvyn Andrews
Attorney, Agent, or Firm—Dorr, Carson, Sloan & Birney, P.C.

[57] ABSTRACT

A metal-containing refractory ore, such as refractory sulfide ore, is split into a first portion and a second portion. The first portion is partially biodigested by a sulfide-digesting microorganism in a biooxidation reactor where the microorganism is acclimated to the sulfide "diet" provided by the ore. The partially digested ore is then combined with the second portion. The resulting material is then dewatered, agglomerated, biooxidized and subjected to a lixiviation process.

76 Claims, 2 Drawing Sheets

INTEGRATED, CLOSED TANK BIOOXIDATION/HEAP BIOLEACH/ PRECIOUS METAL LEACH PROCESSES FOR TREATING REFRACTORY SULFIDE ORES

RELATED PATENTS

This patent application is a continuation-in-part of U.S. patent application Ser. No. 08/857,880 filed May 16, 1997 which is now extant as U.S. Pat. No. 5,873,927 issued Feb. 23, 1999.

BACKGROUND OF THE INVENTION

1. Field of the Invention

This invention generally relates to recovering precious metals from refractory ores. It is particularly concerned with recovering gold and silver from those refractory sulfide ores that have been concentrated by one or more preceding ore processing steps (e.g., flotation cell operations, gravity separations, etc.) and are further characterized by their low precious metal values.

2. Description of the Prior Art

Precious metals are often associated with various sulfide minerals. These minerals are usually characterized as "refractory ores" when their precious metal values are occluded in a metallic sulfide host material. Gold, for example, is often found in the form of finely disseminated sub-microscopic particles that are occluded within a refractory sulfide host of pyrite or arsenopyrite. Consequently, the gold-encapsulating sulfide host material must be at least partially oxidized in order to make the ore's gold component more amenable to subsequent recovery processes wherein the sub-microscopic gold particles are exposed to a leaching agent such as cyanide.

Various sulfide oxidizing "pre-treatments" (i.e., treatments that take place prior to leaching the ore's gold component) have been developed. The most commonly used pre-treatments involve roasting, pressure oxidation and/or bacterial oxidation processes. Unfortunately, each of these processes has certain drawbacks. For example, roasting requires that the temperature of the refractory sulfide ore be raised to levels (e.g., approximately 650 C) that will burn off its sulfide component. Attainment of such temperatures implies high fuel costs. Moreover, in order to obtain autothermal combustion, roasting pre-treatments require that the sulfide component of the refractory sulfide ore be more than about 20 weight percent. Such ores also must have low moisture levels (e.g., the ore should have less than 8% weight percent water). Violation of either of these constricts raises the heat requirements for (and hence, the fuel expense of) roasting operations. Fuel expenses are not, however, the most important drawback associated with refractory sulfide ore roasting. At 650 C roasting temperatures, sulphur components of a refractory sulfide ore react with the surrounding air's oxygen to form various noxious, sulfur oxide gases (e.g., $SO_2$ and $SO_3$). In earlier times, these gases were simply vented to the atmosphere. More and more stringent governmental regulations have, however, restricted such venting practices to a point where most refractory sulfide ore roasting operations have been discontinued.

Pressure oxidation processes employ high purity oxygen, at high temperatures and at high pressures, to oxidize the sulfur components of refractory ores. Aside from the venting problems that are associated with this technology, the high temperatures, high pressures and high oxygen purity requirements of these processes, as well as their need for very expensive, corrosion-resistant autoclave equipment, have prohibited their more extended use, especially for pre-treatment of lower grade refractory ores.

Bacterial oxidation of refractory ores are being more and more widely used, but they are not without their drawbacks. Such processes generally fall into two categories: closed tank biooxidation and heap biooxidation. Each of these processes takes advantage of the fact that certain microorganisms are capable of oxidizing certain metal sulfide materials. For example, various bacteria have been used to oxidize the iron sulfide component of refractory ores. The use of closed tank biooxidation processes is, however, generally limited to use upon those refractory ores having relatively high precious metal value concentrations. Closed tank biooxidation processes also tend to become prohibitively expensive when the refractory ore being treated has a relatively high sulfide concentration. In effect, high sulfide concentrations in refractory ores tends to drive the air supply, cooling, and power input requirements of closed tank biooxidation processes to unacceptable levels. In general, such processes can not be economically justified to pre-treat those ores where the ratio of gold, or precious metal equivalent (in g/t), divided by its sulfur content (in %) is smaller than about 0.7.

The other widely used bacterial oxidation process for treating refractory sulphide ores is open air, heap bioleaching. It begins by breeding a bacterial culture in a liquid medium. The resulting bacteria suspension is then used to agglomerate an unconcentrated form of the ore. The agglomerated ore is stacked (on an appropriate pad system) in the open air and sprayed with the bacteria suspension. Under such conditions, rather long periods of time (e.g., from about 180 to about 600 days) are needed to oxidize the refractory ore's sulfide component. These long process time periods imply high production costs. Eventually, however, the resulting biooxidized refractory ore can be gathered, mixed with lime in order to raise its pH, and then restacked in order to prepare it for conventional hydrometallurgical treatments such as cyanide heap leaching.

Aside from the long periods of time needed to practice them, heap bioleaching processes also have certain technical drawbacks. These drawbacks often follow from the fact that finely ground clay and/or refractory sulfide materials tend to migrate through a heap and plug its channels of air and liquid flow. This results in pudding, channeling, nutrient, carbon dioxide and/or oxygen-starvation, as well as uneven biooxidant distributions. Blocked heap channels have particularly debilitating effects on sulfide-digesting bacteria because these bacteria require large amounts of oxygen to grow and biooxidize the iron sulfide component of such ores. Air flow is also needed to dissipate the heat generated by the exothermic biooxidation reactions that are carried out by sulfide digesting bacteria.

Various closed tank processes, and open air heap biodigesting processes, have been the subject of a number of patents. For example, South African Patent 90/2244 teaches a closed tank bioleaching process for treatment of refractory sulphide ores. This process includes the steps of making a slurry from a refractory ore, subjecting the slurry to the biological oxidation action of certain *Thiobacillus ferrooxidans* species, separating the solid component of the slurry, and then recovering the precious metal from said solid component by, for example, cyanidation procedures.

U.S. Pat. No. 5,246,486 teaches a pre-treatment process based upon biooxidation of a sulfide component of a refractory ore. The process begins by coating refractory sulfide ore particles with an inoculate of a bacteria that is capable of attacking the sulfide component of such an ore. After various other treatments, a heap is constructed from these particles and exposed to the action of a cyanide leaching solution.

U.S. Pat. No. 5,143,543 teaches an improved method of mixing biological conversion components (e.g., nutrients and oxygen) into a biomass. To this end, a portion of a biomass is withdrawn from a reaction tank and sent to an injection zone where the conversion components are injected into a portion of biomass previously withdrawn from the reactor. The resulting mixture is then sent to a static mixer where it is combined with other streams. The resulting material is then returned to the reaction tank.

U.S. Pat. No. 5,021,088 teaches a process for pre-treating gold-bearing, carbonaceous or carbonaceous pyretic ores with one or more heterotrophic microorganisms in order to consume the ore's carbon component. The resulting ore is then colonized with one or microorganisms whose sulfide digestion processes serve to further enhance the ore's susceptibility to subsequent cyanidation processes.

U.S. Pat. No. 4,530,763 teaches a method for removing a metal contaminant from a waste fluid by a process that begins by incubating a bacteria that is capable of attaching to a particular type of metal contaminant. A suspension of the bacteria is placed in a closed tank that is equipped with porous support members suitable for promoting bacteria growth thereon. After the bacteria have had an opportunity to attach themselves to the porous support members, the bacterial medium is removed from the tank. A waste fluid containing the targeted metal contaminant is then introduced into the tank and the porous support members are slowly moved through the waste fluid to allow the bacteria on these support members to attach themselves to the metal contaminant component of the waste fluid. The resulting bacteria/metal contaminant is then separated from the porous support material.

U.S. Pat. No. 5,573,575 teaches a process whereby differences in the adhering qualities of refractory ore particles of different sizes are employed to enhance the overall recovery efficiencies of an open heap leaching process. The first step in the disclosed process is to crush the refractory ore and separate it into a fine particle component and a coarse particle component. The coarse particle component is formed into a heap. The fine particle component is made into a large particle concentrate material that is then added to the coarse particle component heap. The resulting coarse particle/large particle concentrate mixture is thereafter exposed to a heap biooxidation treatment.

U.S. Pat. No. 5,766,930 teaches a process for biotreating a solid material such as an ore in order to remove certain undesired compounds such as sulfides. The process employs a nonstirred bioreactor for this purpose. Using this process, the surface of a plurality of coarse substrates is coated with a solid material to be biotreated to form a plurality of coated coarse substrates. The coarse substrates have average particle sizes greater than about 0.3 cm and the ore particles to be biotreated have average particle size less than about 250 $\mu$m. A nonstirred surface reactor is then formed by stacking the plurality of coated coarse substrates into a heap—or placing the plurality of coated coarse substrates in a tank so that the void volume of the reactor is greater than or equal to about 25 percent. In either case, the ore is inoculated with a microorganism capable of degrading the undesired compound in that ore, and the resulting material is then biotreated in a surface bioreactor until the desired compound in the solid material is degraded to some desired level.

U.S. Pat. No. 5,873,927 teaches a biotreating process wherein a metal-containing refractory sulfide ore stream is split into a first portion and a second portion. The first portion is partially biodigested by a sulfide-digesting microorganism in a biooxidation reactor where the microorganism is acclimated to the sulfide "diet" provided by that particular sulfide-containing ore. The partially digested ore is then combined with the second portion. The resulting mixture is then dewatered, and, preferably, agglomerated, and then biooxidized. Thereafter, it is subjected to a lixiviation process.

These prior art apparatus and processes often suffer from the disadvantage of being prohibitively expensive when they are used upon low grade ores in general—and especially those low grade ores that emanate from relatively small ore bodies. Indeed, there are large amounts of identified low grade refractory ores, as well as stocks of mined ore, that have been set aside because they cannot be processed economically using current precious metal recovery technologies. It is therefore an object of the present invention to provide biooxidation pre-treatment processes that can render such ores amenable to lixiviation at economically acceptable costs.

SUMMARY OF THE INVENTION

The present invention provides economically advantageous processes for recovering precious metal values and/or base metal values from refractory ores in general—and refractory sulfide ores in particular. For example, the hereindescribed processes are particularly useful in treating refractory sulfide minerals such as pyrite, pyrrhotite and arsenopyrite that contain gold, silver or platinum values. These processes also can be used to recover those precious metal values that are associated with chalcopyrite and other copper-bearing minerals. Thus, for the purposes of this patent disclosure, copper-bearing ores should be regarded as falling within applicants' use of the terms "ore," "refractory ore" and "refractory sulfide ore." These terms also should be understood to include carbonaceous refractory ores as well. However, if a given ore is refractory due to the presence of carbonaceous matter contained therein, additional processing steps known to those skilled in this art will normally be employed to treat the pH effects of the carbonaceous components of such ores. The hereindescribed processes also can be used to recover base metal values from refractory ores. Indeed, they can even be used in processes wherein a base metal value is the primary object of such recovery processes.

Next, it should be noted that the processes of this patent disclosure can be carried out on a batch basis, or on a continuous basis, or in processes that intermittently use various combinations of batch and continuous modes of operation. In any case, these processes may be used to treat a wide variety of physical ore forms and grades such as those obtained from flotation cells, hydrocyclones, spiral classifiers, crushers and ball mills. Such processes are, however, particularly useful in treating flotation concentrate forms of those ores that can not be economically recovered through use of prior art tank bioleaching processes, heap bioleaching processes or pressure oxidation processes— either because the precious metal values of a subject ore are too low, or because the size of the refractory sulfide ore body from which they are taken does not warrant the capital expenditures needed to build the facilities needed to carry out these prior art processes. For example, these processes have shown themselves to be particularly effective when the precious metal values in a refractory sulfide ore are as low as about 0.02 equivalent ounces of gold/ton and/or when the subject refractory sulfide ore body contains as little as about 50,000 equivalent ounces of gold.

The more general embodiments of these processes are based primarily upon use of certain integrated, closed tank biooxidation/heap and bioleach/hydrometallurgical treatment circuits. These circuits are most preferably used in conjunction with certain hereinafter more fully described agglomeration procedures. Some of the more specific, and more preferred, embodiments of these processes also will sequentially employ: (1) a distinct closed tank biooxidation process, (2) an open air, heap bioleach process and (3) heap or tank precious metal leaching as a hydrometallurgical process. All of the processes of this patent disclosure are, however, characterized by the fact that a subject refractory sulfide ore (e.g., a stream of a slurry of such an ore) is split into two or more distinct portions. The first portion preferably constitutes from about 0.25 to about 95 weight percent of the refractory sulfide ore source and the second portion preferably constitutes from about 99.75 to about 5 weight percent of said ore source. The first portion is delivered to a first, closed tank, biooxidation reactor where its sulfide component is at least partially digested by one or more sulphide-digesting microorganism species, e.g., *Thiobacillus ferrooxidans*. This first digestion process also serves to acclimate the sulfide digesting microorganism to the "diet" provided by that particular refractory sulfide ore source material. Applicants have found that this acclimation aspect of this biooxidation greatly enhances a microorganism's ability to more effectively digest the second portion of the refractory sulfide ore when the first and second portions of the refractory sulfide ore are subsequently recombined.

This recombination takes place when at least a portion of the material created by the first biooxidation digestion process is combined with at least some of the second refractory sulphide ore portion i.e., the portion that was not sent to the first closed tank, biooxidation reactor, but rather was shunted around said first biooxidation reactor. This recombination preferably occurs in an agitated tank or in a thickening unit wherein the acclimated microorganism has an opportunity to mix with, and inoculate, the unoxidized refractory sulfide ore in the second portion. An agitated tank may be used as the mixing unit if the percent solids of the combined streams is greater than about 60 percent by weight. On the other hand, a thickener is preferably used as a mixing unit if the percent solids of the combined streams is less than about 60 percent by weight. Use of a thickener also will allow mixing of the ore streams while the solids concentration of the combined streams are being increased (e.g., by overflow operations hereinafter more fully described). This solids concentration increase serves to decrease the extent of certain dewatering operations that are subsequently carried out as a part of these overall processes. Whatever the extend of this thickening, however, a more thoroughly inoculated refractory sulphide ore product is produced by the mixing/thickening process.

This more thoroughly inoculated refractory sulfide ore product is then dewatered. The dewatering is preferably carried out by filtration of, or by adding a dryer material to, the more thoroughly inoculated refractory sulfide ore product. If a filtration unit is used to carry out the dewatering procedure, a solid component S and liquid component L will be generated. The liquid component L will include a suspension of the acclimated, sulfide-digesting microorganisms. This suspension is preferably sent to a heap biodigestion pad where it is employed in a manner hereinafter more fully described. The solid component S created by such a filtration procedure will be agglomerated into a particulate or pellet form. This agglomeration can be enhanced through use of agglomeration agent(s) such as a flocculant. The resulting pellets or particles are then stacked in a biooxidation heap and sprayed with a suspension of microorganisms that are capable of digesting a sulfide component of the ore. Most preferably, the agglomerated pellets or particles will be sprayed with a suspension of microorganisms that includes the acclimated, sulfide-digesting microorganisms that were previously obtained as a result of the filtration procedure.

After the agglomerated material is sufficiently biodigested by a sulfide digesting microorganism, (e.g., that contained in the suspension obtained from the filtration procedure), it is prepared for, and subjected to, a lixivation process whereby the material's precious metal values are contacted with and solubilized in, a precious metal lixivating agent such as cyanide or thiourea. This lixivation process can be carried out in a tank, or in an open air, heap leach process.

Thus, some particularly preferred general embodiments of the above-described integrated, closed tank biooxidation/heap bioleach/metal leach process will comprise:

(1) splitting a refractory sulfide ore source material into a first refractory sulfide ore portion and a second refractory sulfide ore portion;

(2) placing the first refractory sulfide ore portion in a closed biooxidation tank wherein at least one sulfide digesting microorganism species digests a sulfide component of the first refractory sulphide ore, biologically multiplies and generally acclimates itself to using the refractory sulfide ore source material as a food source and thereby producing a biooxidation system;

(3) combining a portion of the biooxidation system with at least some of the second refractory sulfide ore portion in a thickening/mixing unit and allowing the acclimated sulphide digesting microorganism species contained in the biooxidation system to inoculate a sulfide component of the second refractory sulfide ore portion and thereby producing a more fully inoculated refractory sulfide ore product;

(4) dewatering the more fully inoculated sulfide ore product (e.g., by filtering the more fully inoculated refractory sulfide ore product, or by adding a dryer material to said sulfide ore product) to produce a dewatered biooxidation reaction product (and, in the case of using a filtration process, a liquid suspension of acclimated, sulfide digesting microorganism species);

(5) agglomerating the dewatered biooxidation reaction product to produce an agglomerated product;

(6) placing the agglomerated product in a biooxidation heap;

(7) treating the biooxidation heap with a microorganism suspension capable of digesting at least a portion of a sulfide component of the agglomerated product (e.g., treating the agglomerated product with a portion of the liquid suspension of acclimated, sulfide digesting microorganism species);

(8) recovering a heap biodigested solid product from the biooxidation heap; and (9) treating the heap biodigested solid product with a precious metal lixivating agent in order to recover a precious metal value from said heap biodigested solid product.

DETAILED DESCRIPTION OF THE INVENTION

Figure 1:
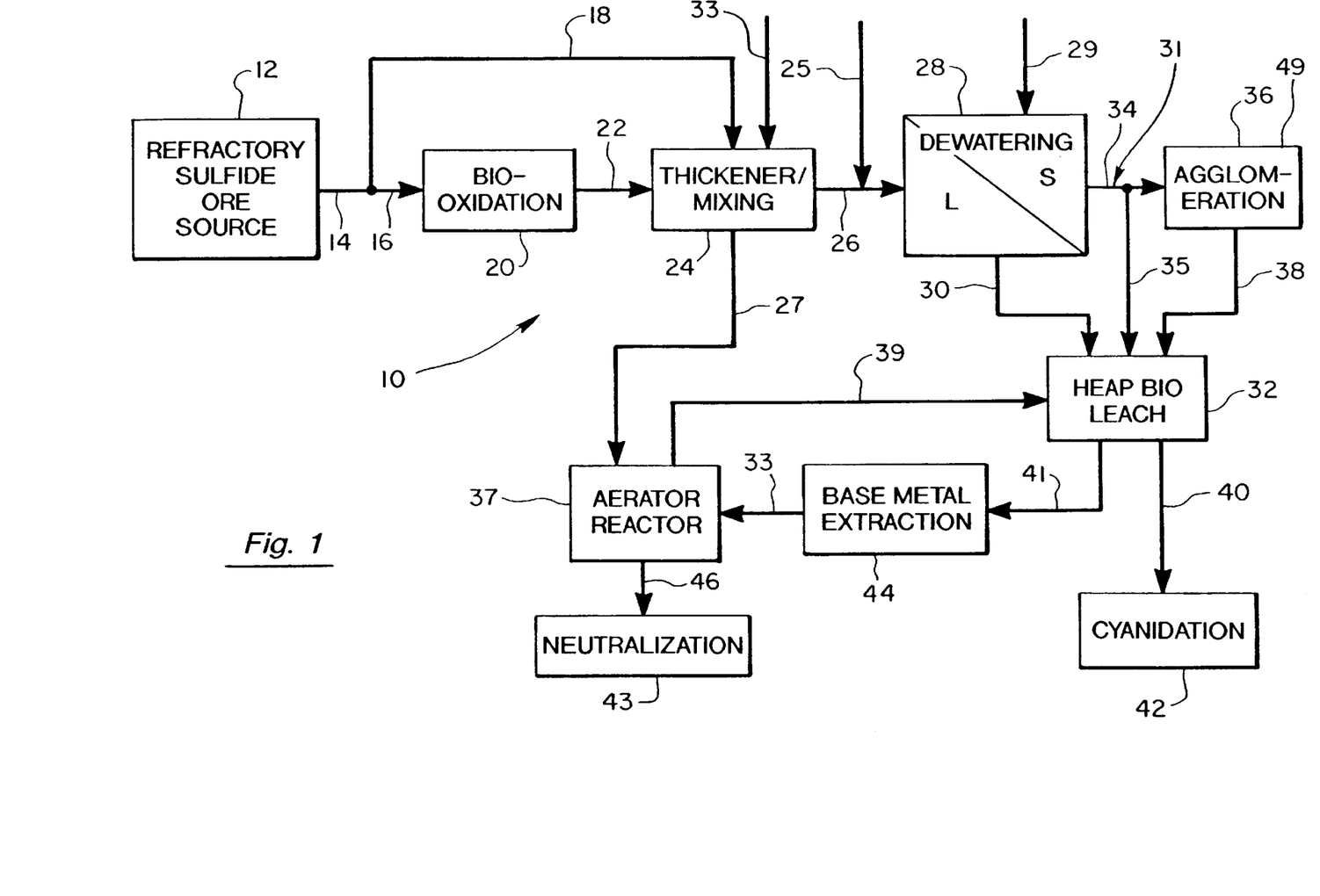
FIG. 1 depicts a flow circuit diagram of an embodiment of a process of this patent disclosure wherein a filtration unit is employed.

For purposes of illustration only, FIG. 1 depicts a generally continuous processes 10 wherein a subject refractory sulfide ore source can be regarded as being in the form of a slurry of said ore. Such a slurry may be, for example, made from the products of a wide variety of preceding milling, separation and/or concentrating operations. In one particularly preferred embodiment of this invention, the refractory sulfide ore source will be a flotation product of a preceding flotation cell process. For example, such a product can be recovered from a xanthate flotation cell and made into a water slurry. Most preferably, such a slurry will have a solids content between about 10 and about 20 percent by weight.

FIG. 1 shows the material (e.g., a slurry) that constitutes a refractory sulfide ore source 12 being split into at least two distinct portions. Again, this splitting can be done on either a flow or a batch basis. For example, FIG. 1 depicts a stream 14 of a slurry of a refractory sulfide ore being split into two separate and distinct streams 16 and 18. The first stream 16 is delivered to a first, closed tank, biooxidation reactor 20. The second stream 18 is shunted around the first biooxidation reactor 20. The first refractory sulfide ore portion that is delivered, via stream 16, to the first biooxidation reactor 20 is preferably reacted therein for a period of from about 16 hours to about 96 hours (and preferably for about 48 hours) with at least one microorganism species capable of oxidizing or otherwise digesting at least a portion of the sulfide component of the refractory sulfide ore. In one of the more preferred embodiments of this invention, the biodigestion taking place in the biooxidation tank is carried out by a *Thiobacillus ferrooxidans* species for a period of from about 16 to about 96 hours (but preferably for about 48 hours) at a pH of from about 0.7 to about 2.2 and more preferably at a pH of from about 1.3 to about 1.4.

Figure 2:
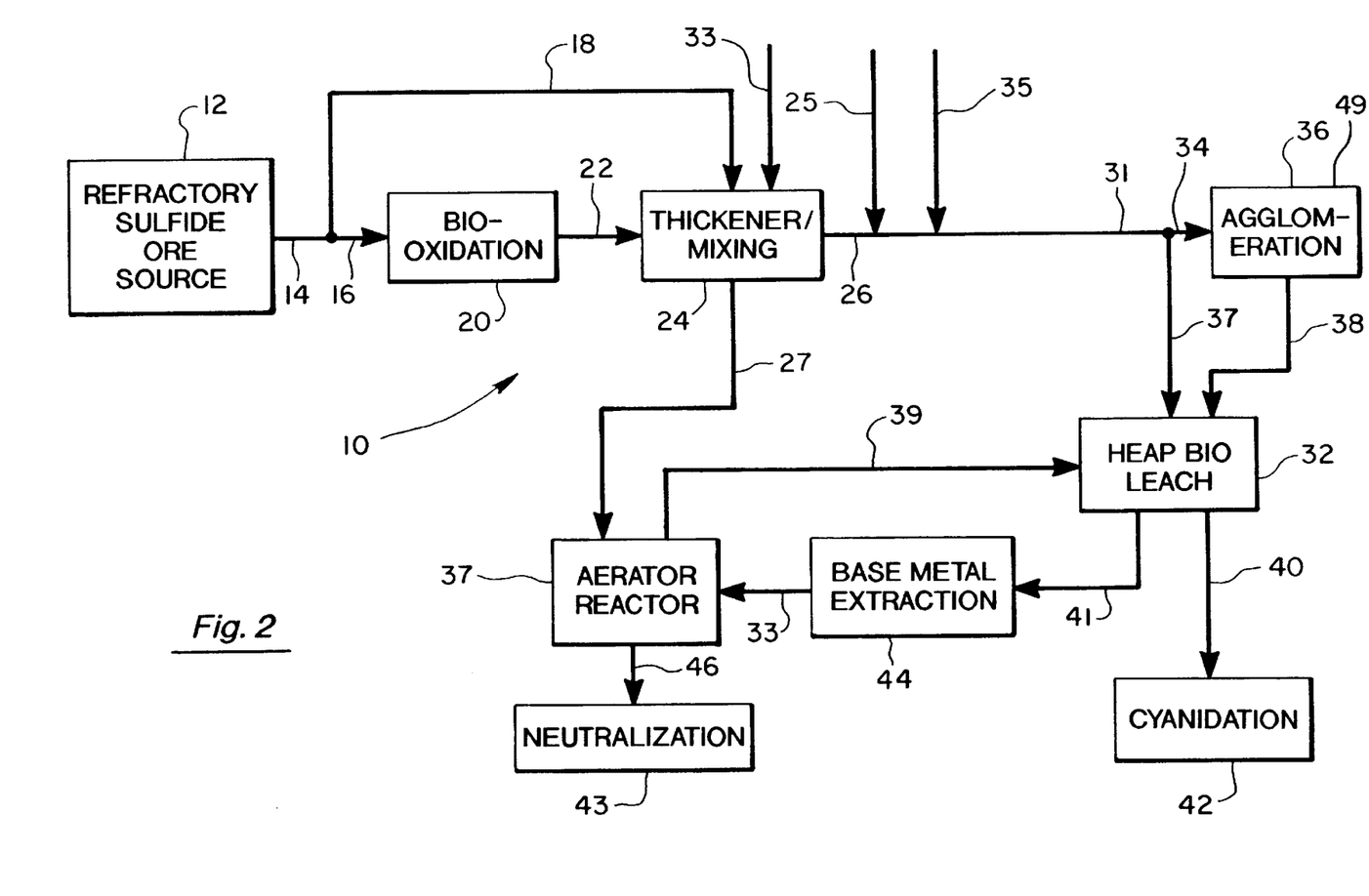
FIG. 2 depicts a flow circuit diagram of an embodiment of a process of this patent disclosure wherein a filtration unit is not employed.

Next, it should be noted that a number of closed first, biooxidation tanks (20A, 20B, 20C, etc., not shown in FIGS. 1 or 2) may be employed according to specific local desires and requirements. Indeed, in many cases, between four and eight of these closed, biooxidation tanks may be employed even though only one is depicted in FIGS. 1 and 2. All such first biooxidation tanks are most preferably operated in a parallel circuit rather than in series. That is to say that the hereindescribed processes do not generally require that a first biooxidation tank product be fed into another "first" biooxidation tank before the resulting product is sent to a thickener/mixer unit 24 wherein the first biooxidation product is combined with the second refractory sulfide ore portion. The refractory sulfide ore slurry introduced into the first biooxidation tank 20 is preferably agitated by some appropriate mechanical means, e.g., by mechanically driven stirrers or by sparged air, so that the solid components of the refractory ore are kept in suspension.

Air or oxygen are preferably sparged into biooxidation tank 20 in order to provide the necessary dissolved oxygen when an aerobic bacterial digestion process is being employed therein. Indeed, the biooxidation reactor 20 may be provided with a wide variety of implements and materials needed to feed, recirculate, stir, augment, cool, provide oxygen for, etc. the microorganism species being employed in biooxidation reactor 20. For example, nutrients such as ammonia, phosphate and potassium can be added to biooxidation tank 20 (and/or to the thickener/mixing unit 24) in those chemical forms and in those physical ways known to those skilled in this art. By way of another example of these additional procedures, it should be noted that, since heat will be generated in the first biooxidation reactor 20, and possibly in thickener/mixing unit 24, it is preferred that each of these devices may be provided with heat exchangers, (for example, a cooling coil) in order to maintain reactor temperatures that will support the life of the particular microorganism species being employed. In the case of *Thiobacillus ferrooxidans*, for example, such temperatures will preferably be maintained in a range of from about 20° C. to about 45° C., and most preferably, at a temperature of about 40° C.

It might also be noted here that the pH of the slurry in the first biooxidation tank 20 (and in the thickener/mixing unit 24) will preferably be controlled by an automatic control unit so that the acid generated by these biooxidation processes can be automatically neutralized. This may be readily achieved by adding lime to either reactor so that the slurry's pH is maintained at an appropriate level, e.g., between about 0.7 and about 2.2 (with a more preferred pH value being from about 1.3 to about 1.8) in those cases where a *Thiobacillus ferroxidans* species is employed as the sulfide-digesting bacteria. In any case, lime for this purpose is most preferably added to the processes of this patent disclosure as a slurry of slaked lime or limestone.

The sulfide digesting efficiency of the bacteria used in applicants' processes also can be enhanced through simultaneous use of multiple microorganism species. For example, bacteria mixtures containing *Thiobacillus thiooxidans, Thiobacillus ferrooxidans*, Leptosoirillum, Thermosulfidooxidans, *Sulfolobus brierlevi, Sulfolobus acidocaldarius,* Sulfolobus BC and/or *Sulfolobus solfactaricus* may be employed. In one particularly preferred embodiment of this invention, a mixture of three distinct bacteria species, namely, strains of *Thiobacillus ferrooxidans, Thiobacillus thiooxidans* and *Leptospirllum ferrooxidans,* may be employed to increase the overall effectiveness of applicants' processes.

For example, *Thiobacillus ferooxidans* species are particularly effective in oxidizing the iron component of various refractory ores that may be used in applicants' processes. They are especially preferred in treating arsenopyrite ores because, through selective techniques and acclimation, the arsenic resistance of *Thiobacillus ferrooxidans* species can be increased from about 1 gram per liter up to about 15 grams per liter. *Thiobacillus thiooxidans* and *Leptosoirillum ferrooxidans* species are particularly characterized by their respective ability to oxidize sulfide materials to sulfate materials and ferrous materials and to ferric forms. Another very useful sulfide digesting bacteria for the practice of this invention is Acidianus species. It may be used alone as well as in mixtures of all of the above noted sulfide digesting bacteria. It also should be noted that any one or all of these microorganisms species can be added at any convenient point in the overall process e.g., at biooxidation reactor 20 and/or to the thickener/mixing unit 24 (e.g., via line 33).

Be the identities of these microorganisms as they may, the first portion of the refractory sulfide slurry will generally remain in the first biooxidation reactor tank 20 for about 16 to about 96 hours. Some refractory sulfide ore concentrates (e.g., those of arsenopyrite) are easier to oxidize using applicants' processes and their precious metal values may be released in less than about 16 hours. Concentrates of other ores, e.g., those of chalcopyrite, and most particularly those derived from the mineral pyrite, will require biooxidation times of as much as about 10 days.

In any case, after such a biooxidation takes place, a portion (e.g., from about 0.25% to 95%) of the biooxidation product of the first biooxidation reactor 20 is removed from said reactor and mixed with a second portion of the subject ore (e.g., an unoxidized flotation concentrate thereof) in a thickener/mixing unit 24 that is large enough to also serve as a surge tank that may be needed prior to any dewatering, or filtration operations. Be that as it may, the contact between the unoxidized concentrate and the acidic biooxidation product slurry resulting from this mixing will generally serve to both acidify and to inoculate the resulting material. This results in acid stabilization of the second portion (e.g., a flotation concentrate) at an appropriate level for biooxidation (0.7 to 2.2 pH).

After the first biooxidation process in reactor 20 has proceeded for some appropriate period of time, a first biooxidation system (comprised of the partially oxidized refractory sulfide ore, a suspension of the sulfide digesting microorganisms, dissolved oxygen, microorganism nutrients and waste products etc.) is then transferred to the thickener/mixing unit 24. In some of the more preferred embodiments of this invention, only a portion of (e.g., about half) the contents of the first biooxidation tank 20 will be transferred to the thickener/mixing unit 24. The portion of the biooxidation system that is left in biooxidation reactor 20 will serve as a "starter material" for commencing digestion of the next portion of unreacted refractory sulfide ore introduced into said reactor 20.

The transferred portion of the resulting biooxidation system is preferably removed from said reactor 20 by a fluid pumping means (not shown in FIG. 1) and delivered, via line 22, to the thickener/mixing unit 24. This thickener/mixing unit 24 also can conveniently serve as a mixing tank for materials contained in the first and second portions of the refractory sulfide ore. If the solids of the first and second stream are less than about 60 percent when combined, it is preferable to use a thickener unit as the mixing unit. The thickening operation carried out in such a unit will serve to both mix the streams and increase the weight percent of the solids in the stream mixture. Again, if the combined solids concentration of the first and the second stream are greater than about 60 percent when combined, an agitated tank may be used for mixing the two streams. Thus, applicants' mixing unit also may be referred to as "thickener unit 24" or "mixing tank 24" in this patent disclosure. Nomenclature aside, the stream 18 of refractory sulfide ore that was shunted around the first biooxidation reactor 20 is, most preferably, delivered directly to the thickener/mixing tank 24 so that the materials contained in streams 18 and 22 can be intimately mixed. If a thickener unit is used as a mixing unit, the solution withdrawn from the thickening unit will contain a suspension of acclimated bacteria which can be put to a particularly good use i.e., the suspension can be applied to the biooxidation heap 32 (e.g., they can be sent to the heap 32 via line 27, aerator reactor 37 and line 39 shown in FIG. 1). The withdrawal of this suspension from the thickener/mixing unit 24 also may be regarded as the first step in the overall "dewatering" of the more fully inoculated ore product.

In any case, the resulting, more fully inoculated ore product (i.e., that material contained in a stream 26 leaving the thickener/mixing unit 24) can then be dewatered in several different ways, or combination of ways. As noted above, this dewatering could commence by simply withdrawing (e.g., by overflow) sufficient quantities of a liquid component from the upper regions of the thickener/mixing unit 24. In most embodiments of this invention, however, the initial dewatering action that occurs in the thickener/mixing unit 24 will be augmented in one of two general ways. The first way is to transfer the resulting, more fully inoculated ore product to a separate and distinct dewatering unit such as a filter unit 28. The second way is to add a dryer material to the ore product that leaves the thickener/mixing unit 24 via line 26.

If employed, such a filter unit 28 will convert a material taken from thickener/mixing unit 24 (e.g., via line 26) into a liquid component L and a solid component S. It might be noted once more that the liquid component L will be a suspension of the working microorganisms and, hence, can be sent (e.g., via line 30) to the heap bioleach process 32 for biooxidation duty. It might also be noted in passing that agglomeration agents may be introduced into filter unit 28 (e.g., via line 29). Such agglomeration agents are, however, more preferably introduced into the process at line 34 (e.g., via line 31) and/or into the agglomeration unit 36 (e.g., via 49). FIG. 1 also indicates that the solid material leaving the filter unit 28 (e.g., via line 34) may be sent directly (via line 35) to the heap bioleach process 32; or said solid material S leaving the filter unit 28 may be sent to an agglomeration unit 36.

The second way the dewatering action can be carried out is by adding one or more relatively "dryer" components to the product leaving the thickener/mixing unit 24 via stream 26. Preferably such dryer material will be a gravel type material such as those selected from the group consisting of screened alluvium gravel, crushed and screen waste rock, crushed and screened ore, sag mill trommel oversized material, ball mill trommel oversized material, appropriately sized plastics, glasses and other inert materials. The dryer material can also be particulate materials such as sand particulate ore products, particulate concentrate ore products and/or particulate waste products taken from ore refining operations. FIG. 2 of this patent disclosure, for example, depicts an embodiment of this invention wherein such a dryer material is added directly (e.g., via line 25) to the material leaving the thickener/mixing unit 24 via line 26.

The flow circuit shown in FIG. 2 is particularly well suited for those dewatering operations carried out by directly adding (e.g., via line 25) a dryer material to the product leaving the thickening/mixing unit 24 (e.g., via line 26). This embodiment of applicants' invention also is particularly well suited for treatment of flotation concentrates e.g., those of a refractory sulfate ore that contains a high $S^{2-}$ content, but which also have a relatively low precious metal concentration. The process depicted in FIG. 2 also is especially well suited for treating refractory ore flotation cell concentrates that are suitable for closed tank bioleaching or pressure oxidation processes, but whose ore body source is simply too small to justify the capital expenditures needed to construct the apparatus needed to carry out such processes. The economic advantage of applicants' process is achieved by virtue of the fact that the process equipment needed to carry out their processes is smaller and less complex than that needed to carry out the prior art processes. Applicants' processes also serves to reduce the time required to oxidize the sulfide component of a given refractory ore and make its precious metal values more amenable to cyanide and thiourea lixivation. Obviously, time savings in such a process translates into economic advantage.

Next, it should be noted that the solids concentration of the material leaving the thickener/mixing unit 24, or resulting from the addition of a dryer material to the more fully inoculated ore product, is preferably increased to about 85 percent for optimal agglomeration activity. Again, this increase in the solids concentration of the combined streams can be accomplished in several ways. For example, it can be carried out by filtering the suspension leaving the thickener/mixing unit 24 and/or by adding relatively dryer materials such as screened materials including gravel, reject ore, waste rock, unscreened material including sand, ore, or waste rock, to the resulting ore system, in an agglomeration unit. Applicants have found that the use of such screened material has proven to be particularly beneficial in adding structure to the agglomerate materials (e.g., pellets of the agglomerated materials) resulting from mixing the dewatered sulfide ore with such screened materials. This improved agglomerate structure permits increased stack heights on the biooxidation pad. It also should be appreciated, however, that if such a screened material is added in the agglomeration stage, it will have to be, either removed prior to the lixivation stage 42, or processed through the lixivation stage 42. In any case, the resulting dewatered material is then, most preferably, agglomerated into pellets having average diameters of at least about ⅜ inches in order to bring about increased percolation and air flow in a biooxidation heap of such pellets.

Preferably, the agglomeration action is brought about by mixing the dewatered product with a binding agent. Most preferably this mixing takes place in an agglomeration-producing device 36 such as a pug mill, drum agglomerator, or on belts, in order to form pellets that will not break down when they are stacked in a biooxidation heap and/or when a leaching solution is applied on to them. Again, this agglomeration action also is most preferably brought about with the aid of an agglomeration agent such as, by way of example only, flocculants, cementaceous materials, binding agents, polymers and coagulants such as, for example, Nalco 9903® flocculant. The agglomerated materials leaving the agglomeration unit 36 most preferably will be in the form of pellets or particles having average diameters in the range of from about ⅜ inches to about ¾ inches.

After the solid components created by the filtration step or the addition of dryer materials are agglomerated, the resulting pellets are then sent, via some appropriate transfer means 38, to a heap bioleach process 32 where a heap of the agglomerated pellets, particles, lumps, etc. is sprayed with a microorganism suspension such as the one removed (via line 27, aerator reactor 37 and line 39) from the thickener/mixing unit 24 and/or the one removed from the filter unit 28 via the line 30 depicted in FIG. 1.

The heap bioleach process 32 will preferably be carried on for a period of from about 15 to about 180 days. This will produce a pre-treated refractory sulfide ore product that is then made ready for treatment with a precious metal lixivating agent such as cyanide or thiourea. The ensuing lixivation process (e.g., cyanidation 42) can be carried out on a heap; but in a particularly preferred embodiment of this process, the lixivation process will be carried out by transferring the biooxidized refractory sulfide ore (by some appropriate transfer means 40) to a tank leach process 42 where a lixivating agent (e.g., cyanide) can contact and solubilize a precious metal component (or components) of the pre-treated refractory sulfide ore. Thereafter, the solubilized precious metal component can be recovered by methods well known to those skilled in this art.

Those skilled in this art will appreciate that a bacteria-containing solution run off from the heap bioleach process 32 may contain base metal values such as those of nickel, zinc, lead, copper, etc. FIGS. 1 and 2 each indicate that this solution 41 may be run through a base metal extraction unit 44 to recover said base metal values. In one embodiment of this invention, an oxide ore is blended with a sulfide ore to facilitate recovery of a base metal value from an oxide ore. This blending preferably occurs during the agglomeration stage so that the base metal value can be extracted during the heap biooxidation process. Indeed, the processes of this patent disclosure may be used to treat ores whose primary—or only—metal value(s) is (are) base metal(s).

For example, a copper ore, bacterial suspension 41 from the heap bioleach process 32 can be sent to aerator reactor 37 for treatment. At least a portion of a resulting aerated material from the aerator reactor 37 is preferably sent (e.g., via line 39) back to the bioheap leach 32 and used again as a biooxidation agent spray on said heap bioleach process 32. The remainder, if any, of the suspension 41 can be disposed of in various ways, e.g., it can be sent (e.g., via line 46) to a neutralization unit 48 where it can be neutralized and thickened with limestone. In another embodiment of this invention, a slurry from the neutralization unit 43 also may be dewatered with some of the water being returned to the biooxidation reactor 20 as dilution water with the remainder of said water preferably being returned to a heap run-off pond (not shown). The solids from the neutralization/thickening step are thereafter disposed of—preferably in conjunction with a disposal of various plant flotation and cyanidation tailings (not shown).

The solution run-off 41 from the bioheap leach process 32 will often contain high concentrations of $Fe^{2+}$ and possibly $As^{3+}$. Hence, this solution run-off 41 from the base metal extraction 44 is preferably, via recycling line 33, to be re-oxidized in an aerated reactor 37 to which air and additional nutrients may be added. In this embodiment, $Fe^{2+}$ is oxidized to $Fe^{3+}$ and $As^{3+}$ (if present) is oxidized to $As^{5+}$. The resulting $Fe^{2+}$, $As^{5+}$ solution is thereby rendered more suitable for subsequent irrigation of the bio-heap leach process 32.

Since circulation of an active bacterial culture solution through the bioheap leach process 32 results in an increase in the dissolved ion concentration, a purge also may be introduced to prevent this ion build-up. Such a purge can be achieved by removing neutralization solution from the neutralization unit 43. In any case, neutralization of the solution is preferably carried out in a series of continuously stirred reactors ("CSTRs") not shown, by addition of limestone ($CaCO_3$). Hence this series of CSTRs may serve as the neutralization unit 43 shown in both FIG. 1 and FIG. 2. The volume of the CSTRs is preferably such that the total residence time of the solution will be at least about 4 hours. A portion of the slurry from such CSTRs also may be recycled to a feed reactor to promote large particle growth and to reduce limestone consumption. The pH in such a CSTR reactor is preferably controlled at a pH of about 5.5 by the addition of limestone. The neutralization unit 43 preferably, will be provided with a thickener to separate the neutralized solution from its solid components.

Those skilled in this art also will appreciate that the arsenic content of such a solution collected in such CSTRs may be precipitated in the form of ferric arsenate which conforms to the USA EPA standards for land disposal. USA EPA standard TCLP tests on the solid precipitate indicate that this solid is environmentally stable. The slurry from such a neutralization tank 43 is preferably dewatered in a thickener and the solids in the thickener underflow are discarded together with the flotation and cyanidation tailings. The solution from a neutralization thickener also may be used in the dilution of flotation concentrate ahead of the biooxidation reactor 20 and also in controlling the pH in a run-off pond.

The bioheap (or bioheaps) that is (are) employed in applicants' processes can be constructed in a manner similar to that employed to construct conventional cyanide heap leach pads. In any case, once the ore containing, agglomerated material is stacked in a heap in a bio-heap leach system, solution application lines will be placed on top of that material, and a nutrient-rich and bacteria-rich, solution applied to said material. Air also may be injected through the lines in an overliner to supply oxygen, carbon dioxide, and to cool the heap if necessary. After sufficient oxidation has occurred to allow for subsequent recovery of the precious metals, the biooxidized ore material is removed from the pad, neutralized and prepared for lixivation.

Part of this preparation also may include breaking up this bioheap leach material and mixing it with an alkaline agent (e.g., lime) to increase its pH (preferably to a pH Value of at least about 10 to about 12). The material resulting from this alkalization procedure is then, most preferably, heated to between about 40° C. and about 80° C. more preferably 50° C. for a period of from about 1 to about 12 hours (more preferably, about 4 hours). Such additional processes will serve to complete some of the more preferred "pretreatment" of the refractory sulfide ore. Be that as it may, the material taken from the biooxidation heap is then ready to be treated in a conventional precious metal lixivation process (e.g., in a cyanidation process) in order to solubilize, and ultimately recover, the precious metal contained in said ore.

Although the processes of this patent disclosure have been described in terms of and with reference to certain preferred embodiments and specific examples, it will readily be appreciated by those skilled in this art that many modifications and adaptations of these processes are possible without departure from the spirit and scope of the invention as claimed hereinafter. For example, while the processes according to the present invention have been largely described in terms of recovering gold from a flotation concentrate form of a refractory sulfide ore, these processes are equally applicable to recovering other precious metal values found in such ores (e.g., silver and platinum). Moreover, these processes may be used to process other ore types (e.g., copper-bearing ores) that primarily contain base metal values such as those of zinc, copper, lead, nickel, etc., including those in other physical forms (e.g., in crushed ore particles).

Thus having disclosed this invention, what is claimed is:

1. An integrated, closed tank biooxidation/heap bioleach/metal leach process for recovering a metal value from a refractory ore, said process comprising:
   (1) splitting a refractory ore into a first portion and a second portion;
   (2) placing the first portion in a biooxidation reactor wherein at least one microorganism species inoculates and at least partially digests a component of the refractory ore component of the first portion, biologically multiplies and generally acclimates itself to using the refractory ore as a food source and thereby producing a resulting biooxidation system;
   (3) combining a portion of the resulting biooxidation system with at least some of the second portion in a thickener/mixing unit and allowing the acclimated microorganism species contained in the resulting biooxidation system to inoculate and at least partially digest a refractory ore component of the second portion and thereby produce a more fully inoculated, blended, refractory ore product;
   (4) dewatering the more fully inoculated, blended, refractory ore product to produce a dewatered, biooxidation product;
   (5) agglomerating the dewatered, biooxidation product to produce an agglomerated, refractory ore product;
   (6) placing the agglomerated, refractory ore product in a heap biooxidation heap;
   (7) treating the biooxidation heap with a liquid suspension of a microorganism species capable of digesting a component of the refractory ore product; and
   (8) recovering a heap biodigested solid product from the biooxidation heap.

2. The process of claim 1, which further comprises lixivation of the heap biodigested solid product by leaching said product with a cyanide lixiviant.

3. The process of claim 1 that further comprises treating the heap biodigested solid product with a precious metal lixivating agent in order to solubilize and ultimately recover a metal value from said heap biodigested solid product.

4. The process of claim 1 wherein the more fully inoculated, blended, refractory ore product is at least partially dewatered by removing a liquid suspension from the thickener/mixing unit.

5. The process of claim 1 wherein the more fully inoculated, blended, refractory ore product is at least partially dewatered by filtration.

6. The process of claim 1 wherein the more fully inoculated, blended, refractory ore product is at least partially dewatered by addition of a dryer material to said more fully inoculated blended, refractory ore product.

7. The process of claim 1 wherein the more fully inoculated, blended, refractory ore product is dewatered by removing a suspension from the thickener/mixing unit and by filtration of the resulting material.

8. The process of claim 1 wherein the more fully inoculated, blended, refractory ore product is dewatered by removing a suspension from the thickener/mixing unit and by adding a dryer material to said refractory ore product.

9. The process of claim 1 wherein the more fully inoculated, blended, refractory ore product is agglomerated with a dryer material in an agglomeration action producing device.

10. The process of claim 1 wherein the dewatered, biooxidation product is agglomerated with a dryer material with the aid of a flocculation agent.

11. The process of claim 1 wherein the dyer material is a gravel.

12. The process of claim 1 wherein the dryer material is a gravel selected from the group consisting of screened alluvium gravel, crushed and screen waste rock, crushed and screened ore, sag mill trommel oversized material, ball mill trommel oversized material, appropriately sized plastics, glasses and other inert materials.

13. The processes of claim 1 wherein the dryer material is a particulate material selected from the group consisting of particles of sand, particles of the ore being processed and particles of ore processing waste materials.

14. The process of claim 1 that further comprises use of a solution extraction process to recover a base metal value from a solution run-off recovered from the biooxidation heap.

15. The process of claim 1 that further comprises a step wherein an oxide ore is blended with a sulfide ore to facilitate recovery of a base metal value from said oxide ore.

16. The process of claim 1, wherein the metal value is gold.

17. The process of claim 1 wherein the metal value is silver.

18. The process of claim 1, where the metal value is a platinum group metal.

19. The process of claim 1, wherein the metal value is copper.

20. The process of claim 1 wherein the metal value is nickel.

21. The process of claim 1 wherein the metal value is zinc.

22. The process of claim 1 wherein the microorganism species is a *Thiobacillus ferrooxidans* species.

23. The process of claim 1, wherein the microorganism species is a *Thiobacillus thiooxidans* species.

24. The process of claim 1, wherein the microorganism species is a *Leptospirillum ferrooxidans* species.

25. The process of claim 1 wherein the microorganism species is a mixture of microorganism species.

26. The process of claim 1 wherein the refractory ore digesting microorganism species is selected from the group consisting of *Thiobacillus thiooxidans, Thiobacillus ferrooxidans, Leptospirillum ferrooxidans,* Thermosulfidooxidans, *Sulfolobus brierlevi, Sulfolobus acidocaldarius,* Sulfolobus BC and *Sulfolobus solfactaricus*.

27. The process of claim 1 wherein the microorganism species is a mixture of *Thiobacillus ferrooxidans, Thiobacillus thiooxidans* and *Leptospirillum ferrooxidans* species.

28. The process of claim 1 wherein a weight percentage ratio of a gold equivalent (g/t) of the refractory ore, divided by its refractory material content, is smaller than about 0.7.

29. The process of claim 1 wherein the refractory ore has a ratio of gold, or precious metal equivalent (in g/t), divided by its sulfur content (in %) is greater than about 0.25.

30. The process of claim 1 wherein the refractory ore is split into a first portion that constitutes from about 0.25 percent to about 95 percent weight percent of the refractory ore and a second portion that constitutes from about 99.75 percent to about 5 percent weight percent of said ore.

31. The process of claim 1 wherein the first portion is digested in the biooxidation reactor by a *Thiobacillus ferrooxidans* species for a period of from about 16 to about 96 hours at a pH of from about 1.0 to about 2.0.

32. The process of claim 1 wherein the first portion is digested in the biooxidation reactor and the second portion are mixed in a thickener/mixing unit to allow thorough inoculation of the second ore portion.

33. The process of claim 1 wherein the dewatered, biooxidation product is agglomerated with a flocculant binding agent.

34. The process of claim 1 wherein the first portion is digested in the biooxidation reactor by a *Thiobacillus ferrooxidans* species for a period of from about 16 to about 96 hours at a pH of from about 0.7 to about 2.2.

35. The process of claim 1 wherein the first portion is digested in the biooxidation reactor by a *Thiobacillus ferrooxidans* species for a period of from about 16 to about 96 hours at a pH of from about 1.1 to about 1.7.

36. The process of claim 1 wherein the heap biodigested solid product is heated to a temperature from about 50 to 60° C. for about 1 hour to 12 hours before it is treated with a lixiviation agent.

37. The process of claim 1 wherein the heap biodigested solid product is treated with a cyanide lixiviation agent in a tank.

38. The process of claim 1 wherein the heap biodigested solid product is formed into a heap that is treated with a cyanide lixiviation agent.

39. An integrated, closed tank biooxidation/heap bioleach/metal leach process tank/heap for recovering a precious metal value from a refractory sulfide ore, said process comprising:

(1) splitting a refractory sulfide ore into a first portion and a second portion;

(2) placing the first portion in a biooxidation reactor wherein at least one microorganism species inoculates and at least partially digests a component of the refractory sulfide ore component of the first portion, biologically multiplies and generally acclimates itself to using the refractory sulfide ore as a food source and thereby producing a resulting biooxidation system;

(3) combining a portion of the resulting biooxidation system with at least some of the second portion in a thickener/mixing unit and allowing the acclimated microorganism species contained in the resulting biooxidation system to inoculate and at least partially digest a refractory sulfide ore component of the second portion and thereby produce a more fully inoculated, blended, refractory sulfide ore product;

(4) dewatering the more fully inoculated, blended, refractory sulfide ore product to produce a dewatered, biooxidation product;

(5) agglomerating the dewatered, biooxidation product a produce an agglomerated, refractory sulfide ore product;

(6) placing the agglomerated, refractory sulfide ore product in a heap biooxidation heap;

(7) treating the biooxidation heap with a liquid suspension of a microorganism species capable of digesting a component of the refractory sulfide ore; and (8) recovering a heap biodigested solid product from the biooxidation heap.

40. The process of claim 39 that further comprises treating the heap biodigested solid product with a precious metal lixivating agent in order to solubilize and ultimately recover a metal value from said heap biodigested solid product.

41. The process of claim 39, which further comprises lixivation of the heap biodigested solid product by leaching said product with a cyanide lixiviant.

42. The process of claim 39 wherein the more fully inoculated, blended, refractory sulfide ore product is at least partially dewatered by removing a liquid suspension from the thickener/mixing unit.

43. The process of claim 39 wherein the more fully inoculated, blended, refractory sulfide ore product is at least partially dewatered by filtration.

44. The process of claim 39 wherein the more fully inoculated, blended, refractory sulfide ore product is at least partially dewatered by addition of a dryer material to said more fully inoculated blended, refractory sulfide ore product.

45. The process of claim 39 wherein the more fully inoculated, blended, refractory sulfide ore product is dewatered by removing a suspension from the thickener/mixing unit and by filtration of the resulting material.

46. The process of claim 39 wherein the more fully inoculated, blended, refractory ore product is dewatered by removing a suspension from the thickener/mixing unit and by adding a dryer material to said refractory sulfide ore product.

47. The process of claim 39 wherein the more fully inoculated, blended, refractory sulfide ore product is agglomerated with a dryer material in an agglomeration action producing device.

48. The process of claim 39 wherein the dewatered, biooxidation product is agglomerated with a dryer material with the aid of a flocculation agent.

49. The process of claim 39 wherein the dyer material is a gravel.

50. The process of claim 39 wherein the dryer material is a gravel selected from the group consisting of screened alluvium gravel, crushed and screen waste rock, crushed and screened ore, sag mill trommel oversized material, ball mill trommel oversized material, appropriately sized plastics, glasses and other inert materials.

51. The processes of claim 39 wherein the dryer material is a particulate material such as sand, particles of the ore being processed and particulate waste materials.

52. The process of claim 39 that further comprises use of a solution extraction process to recover a base metal value from a solution run-off recovered from the biooxidation heap.

53. The process of claim 39 that further comprises a step wherein an oxide ore is blended with a sulfide ore to facilitate recovery of a base metal value from the oxide ore.

54. The process of claim 39, wherein the metal value is gold.

55. The process of claim 39 wherein the metal value is silver.

56. The process of claim 39, where the metal value is a platinum group metal.

57. The process of claim 39, wherein the metal value is copper.

58. The process of claim 39 wherein the metal value is nickel.

59. The process of claim 39 wherein the metal value is zinc.

60. The process of claim 39 wherein the microorganism species is a *Thiobacillus ferrooxidans* species.

61. The process of claim 39, wherein the microorganism species is a *Thiobacillus thiooxidans* species.

62. The process of claim 39, wherein the microorganism species is a *Leptospirillum ferrooxidans* species.

63. The process of claim 39 wherein the microorganism species is a mixture of microorganism species.

64. The process of claim 39 wherein the refractory sulfide ore digesting microorganism species is selected from the group consisting of *Thiobacillus thiooxidans, Thiobacillus ferrooxidans, Leptospirillum ferrooxidans,* Thermosulfidooxidans, *Sulfolobus brierlevi, Sulfolobus acidocaldarius,* Sulfolobus BC and *Sulfolobus solfactaricus.*

65. The process of claim 39 wherein the microorganism species is a mixture of *Thiobacillus ferrooxidans, Thiobacillus thiooxidans* and *Leptospirillum ferrooxidans* species.

66. The process of claim 39 wherein a weight percentage ratio of a gold equivalent (g/t) of the refractory sulfide ore, divided by its refractory material content, is smaller than about 0.7.

67. The process of claim 39 wherein the refractory sulfide ore has a ratio of gold, or precious metal equivalent (in g/t), divided by its sulfur content (in %) is greater than about 0.25.

68. The process of claim 39 wherein the refractory sulfide ore is split into a first portion that constitutes from about 0.25 percent to about 95 percent weight percent of the refractory ore and a second portion that constitutes from about 99.75 percent to about 5 percent weight percent of said ore.

69. The process of claim 39 wherein the first portion is digested in the biooxidation reactor by a *Thiobacillus ferrooxidans* species for a period of from about 16 to about 96 hours at a pH of from about 1.0 to about 2.0.

70. The process of claim 39 wherein the first portion is digested in the biooxidation reactor and the second portion are mixed in a thickener/mixing unit to allow thorough inoculation of the second ore portion.

71. The process of claim 39 wherein the dewatered, biooxidation product is agglomerated with a flocculant binding agent.

72. The process of claim 39 wherein the first portion is digested in the biooxidation reactor by a *Thiobacillus ferrooxidans* species for a period of from about 16 to about 96 hours at a pH of from about 0.7 to about 2.2.

73. The process of claim 39 wherein the first portion is digested in the biooxidation reactor by a *Thiobacillus ferrooxidans* species for a period of from about 16 to about 96 hours at a pH of from about 1.1 to about 1.7.

74. The process of claim 39 wherein the heap biodigested solid product is heated to a temperature from about 50 to 60° C. for about 1 hour to 12 hours before it is treated with a lixiviation agent.

75. The process of claim 39 wherein the heap biodigested solid product is treated with a cyanide lixiviation agent in a tank.

76. The process of claim 39 wherein the heap biodigested solid product is formed into a heap that is treated with a cyanide lixiviation agent.

\* \* \* \* \*